(12) United States Patent
Lee

(10) Patent No.: US 10,684,798 B2
(45) Date of Patent: Jun. 16, 2020

(54) MEMORY CONTROLLER AND MEMORY SYSTEM HAVING THE SAME

(71) Applicant: SK hynix Inc., Gyeonggi-do (KR)

(72) Inventor: Joo Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/164,144

(22) Filed: Oct. 18, 2018

(65) Prior Publication Data

US 2019/0286370 A1     Sep. 19, 2019

(30) Foreign Application Priority Data

Mar. 19, 2018    (KR) .................. 10-2018-0031753

(51) Int. Cl.
*G06F 3/06*     (2006.01)
(52) U.S. Cl.
CPC .......... *G06F 3/0659* (2013.01); *G06F 3/0604* (2013.01); *G06F 3/0656* (2013.01); *G06F 3/0679* (2013.01)

(58) Field of Classification Search
CPC .... G06F 3/0659; G06F 3/0604; G06F 3/0679; G06F 3/0656
USPC ........................................................ 711/154
See application file for complete search history.

(56) References Cited

U.S. PATENT DOCUMENTS

2018/0307597 A1* 10/2018 Oh ...................... G06F 3/0635

FOREIGN PATENT DOCUMENTS

| KR | 1020140071135 | 6/2014 |
|---|---|---|
| KR | 1020150138713 | 12/2015 |

* cited by examiner

*Primary Examiner* — Hua J Song
(74) *Attorney, Agent, or Firm* — IP & T Group LLP

(57) ABSTRACT

A memory controller includes a flash translation layer configured to output a descriptor including a command and physical information and logical information associated with the command, and a flash interface layer configured to receive the descriptor, individually store the command, the physical information, and the logical information that are included in the descriptor, adjust a queue of the command, and output the command to a memory device according to an adjusted queue of the command.

19 Claims, 8 Drawing Sheets

MEMORY CONTROLLER AND MEMORY SYSTEM HAVING THE SAME

CROSS-REFERENCE TO RELATED APPLICATION

The present application claims priority under 35 U.S.C. § 119(a) to Korean patent application number 10-2018-0031753, filed on Mar. 19, 2018, which is incorporated herein by reference in its entirety.

BACKGROUND

1. Field of Invention

Various embodiments of the present disclosure relate to a memory controller and a memory system having the memory controller, and more particularly, to a memory controller including a flash translation layer and a memory system having the memory controller.

2. Description of Related Art

A memory system may include a memory device and a memory controller.

The memory device may store data or output stored data. For example, the memory device may be implemented as a volatile memory device in which stored data is lost when the supply of power is interrupted or as a nonvolatile memory device in which stored data is retained even when the supply of power is interrupted.

The memory controller may control data communication between a host and the memory device. When the memory device is implemented as a flash memory device which is a kind of nonvolatile memory device, the memory controller may include a flash translation layer to perform communication between the memory device and the host.

The host may communicate with the memory device through the memory controller using an interface protocol, such as Peripheral Component Interconnect-Express (PCI-E), Advanced Technology Attachment (ATA), Serial ATA (SATA), Parallel ATA (PATA) or Serial Attached SCSI (SAS). Interface protocols between the host and the memory system are not limited to the above-described examples, and may include various interfaces, such as Universal Serial Bus (USB), Multi-Media Card (MMC), Enhanced Small Disk Interface (ESDI), or Integrated Drive Electronics (IDE).

SUMMARY

Various embodiments of the present disclosure are directed to a memory system having a memory controller. The memory controller having an improved flash translation layer capable of mapping physical information and logical information of a command to a corresponding descriptor.

An embodiment of the present disclosure may provide for a memory controller. The memory controller may include a flash translation layer configured to output a descriptor including a command and physical information and logical information associated with or about the command, and a flash interface layer configured to receive the descriptor, individually store the command, the physical information, and the logical information that are included in the descriptor, adjust a queue of the command, and then output the command to a memory device according to an adjusted queue of the command.

An embodiment of the present disclosure may provide for a memory controller. The memory controller may include a flash translation layer configured to output a descriptor including a command and physical information and logical information associated with or about the command, and a flash interface layer configured to receive the descriptor and store the command, the physical information, and the logical information included in the descriptor, and to transmit the command, the physical information, and the logical information for a requested descriptor to the flash translation layer when a request is received from the flash translation layer.

An embodiment of the present disclosure may provide for a memory system. The memory system may include a memory controller configured to generate a command in response to a request from a host and generate a descriptor including both physical information and logical information associated with or about the command, and configured to, when the descriptor is requested, output all of the command, the physical information, and the logical information included in the descriptor, and a memory device configured to program, read or erase data in response to the command outputted from the memory controller.

An embodiment of the present disclosure may provide for a memory controller. The memory controller may include a command generator configured to generate a command, a physical information storage buffer configured to buffer physical information about the command, a logical information storage buffer configured to buffer logical information about the command, a descriptor output circuit configured to generate a descriptor including the command, the physical information, and the logical information associated to the command, a lookup table configured to store the descriptor, a command queue configured to queue the command included in the descriptor, a flash interface configured to provide the queued command to the memory device to perform an operation in response to the provided command, and an error correction unit configured to perform an error correction operation according to the descriptor, wherein the lookup table provides the command generator with the descriptor stored therein through the physical and logical information storage buffers in response to a request provided from the command generator.

DETAILED DESCRIPTION

Advantages and features of the present disclosure, and methods for achieving the same will be cleared with reference to exemplary embodiments described later in detail together with the accompanying drawings. The present disclosure is not limited to the following embodiments but embodied in other forms. Rather, these embodiments are provided so that the present disclosure will be thorough and complete, and will fully convey the technical spirit of the disclosure to those skilled in the art.

It is also noted that in this specification, "connected/coupled" refers to one component not only directly coupling another component but also indirectly coupling another component through an intermediate component. In the specification, when an element is referred to as "comprising" or "including" a component, it does not preclude another component but may further include other components unless the context clearly indicates otherwise.

Figure 1:
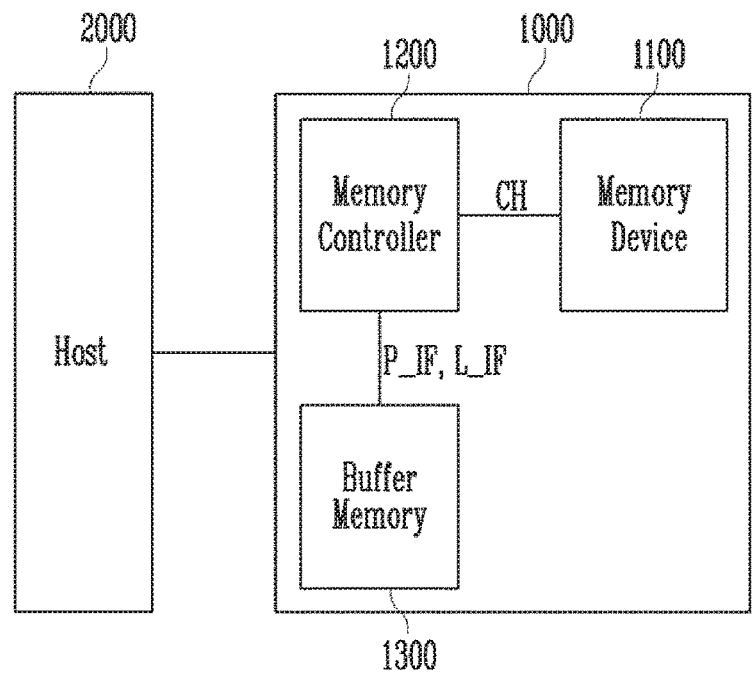
FIG. 1 is a diagram illustrating a memory system in accordance with an embodiment of the present disclosure.

FIG. 1 is a diagram illustrating a memory system in accordance with an embodiment of the present disclosure.

Referring to FIG. 1, a memory system 1000 may include a memory device 1100 which stores data, a buffer memory 1300 which temporarily stores data required for the operation of the memory system 1000, and a memory controller 1200 which controls the memory device 1100 and the buffer memory 1300 under the control of a host 2000.

The host 2000 may communicate with the memory system 1000 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), NonVolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The memory device 1100 may be implemented as a volatile memory device in which stored data is lost when the supply of power is interrupted or as a nonvolatile memory device in which stored data is retained even when the supply of power is interrupted. In the present embodiment, a flash memory device which is a kind of nonvolatile memory device will be described by way of example.

The memory controller 1200 may control the overall operation of the memory system 1000, and may control data exchange between the host 2000 and the memory device 1100. The memory controller 1200 may be coupled to the memory device 1100 through a channel CH, and may transmit a command, an address, and data through the channel CH. For example, the memory controller 1200 may transmit a command for a program operation, a read operation or an erase operation to the memory device 1100 through the channel CH in response to a request received from the host 2000.

The memory controller 1200 may control data exchange between the host 2000 and the buffer memory 1300 or may temporarily store system data for controlling the memory device 1100 in the buffer memory 1300. For example, the memory controller 1200 may transmit physical information P_IF of the memory device 1100 and logical information L_IF related to the operation of the memory system 1000 to the buffer memory 1300 or may receive the physical information and the logical information from the buffer memory 1300.

The buffer memory 1300 may be used as a working memory, a cache memory or a buffer memory of the memory controller 1200, and may temporarily store the physical information and the logical information. In an embodiment, the buffer memory 1300 may include a double data rate synchronous dynamic random access memory (DDR SDRAM), a DDR fourth generation (DDR4) SDRAM, a low power DDR fourth generation (LPDDR4) SDRAM, a graphics double data rate (GDDR) SDRAM, a low power DDR (LPDDR) SDRAM, or a Rambus DRAM (RDRAM).

Figure 2:
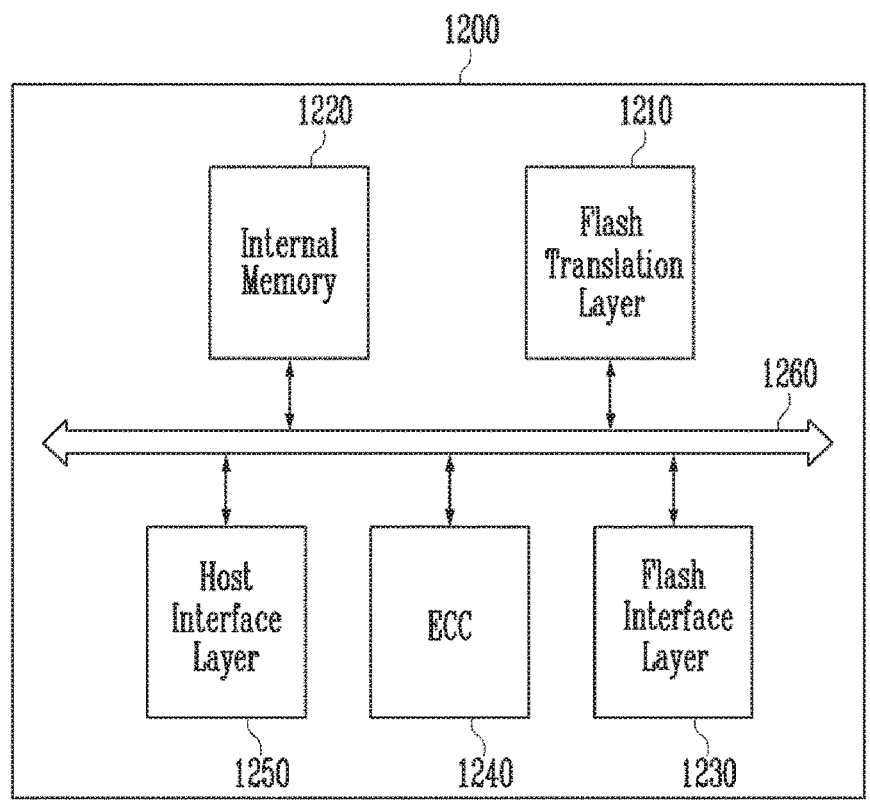
FIG. 2 is a diagram illustrating a memory controller of FIG. 1.

FIG. 2 is a diagram illustrating the memory controller of FIG. 1.

Referring to FIG. 2, the memory controller 1200 may include a flash translation layer (FTL) 1210, an internal memory 1220, a flash interface layer (FIL) 1230, an error correction circuit (ECC) 1240, and a host interface layer (HIL) 1250 in order to perform communication between the host 2000 and the memory device 1100. The flash translation layer 1210, the internal memory 1220, the flash interface layer 1230, the error correction circuit 1240, and the host interface layer 1250 may communicate with each other through a bus 1260.

The flash translation layer 1210 may associate physical information with logical information between the host 2000 operating on a sector basis and the memory device 1100 operating on a block or page basis, and may run firmware based on the associated information. For example, when a request is received from the host 2000, the flash translation layer 1210 may generate a command for handling the received request. Further, the flash translation layer 1210 may add physical information and logical information related to or about the memory device 1100, where the command is executed to a single descriptor and may transmit the descriptor to the flash interface layer 1230. Further, when an error correction operation is required, the flash translation layer 1210 may receive the descriptor from the flash interface layer 1230, and may control the error correction circuit 1240 to perform an error correction operation based on the physical information and the logical information included in the received descriptor.

The internal memory 1220 may store various types of system information required for the operation of the memory controller 1200. For example, the internal memory 1220 may be implemented as a Static RAM (SRAM). The internal memory 1220 may store address mapping information and logical information which are required for the operation of the memory system 1000.

The flash interface layer 1230 may communicate with the memory device 1100 under the control of the flash translation layer 1210. For example, the flash interface layer 1230 may receive a descriptor from the flash translation layer 1210, and may store physical information and logical Information included in the descriptor so that the physical information and the logical information are mapped to the corresponding descriptor. For example, the flash interface layer 1230 may queue commands included in the descriptor depending on the status of the memory device 1100, and may output the commands to the memory device 1100 in a sequence in which the commands are queued. Further, when a request is received from the flash translation layer 1210, the flash interface layer 1230 may transmit a descriptor including stored physical information and logical information to the flash translation layer 1210.

The error correction circuit 1240 may perform an error correction operation under the control of the flash translation layer 1210. For example, the error correction circuit 1240 may perform an error correction operation in response to an error correction command, physical information, and logical information which are received from the flash translation layer 1210.

The host interface layer 1250 may be configured to communicate with the host 2000 coupled to the memory system 1000 under the control of the flash translation layer 1210. For example, the host Interface layer 1250 may receive various requests, such as a program request, a read request, and an erase request, from the host 2000, and may output data read from the memory device 1100 to the host 2000.

Figure 3:
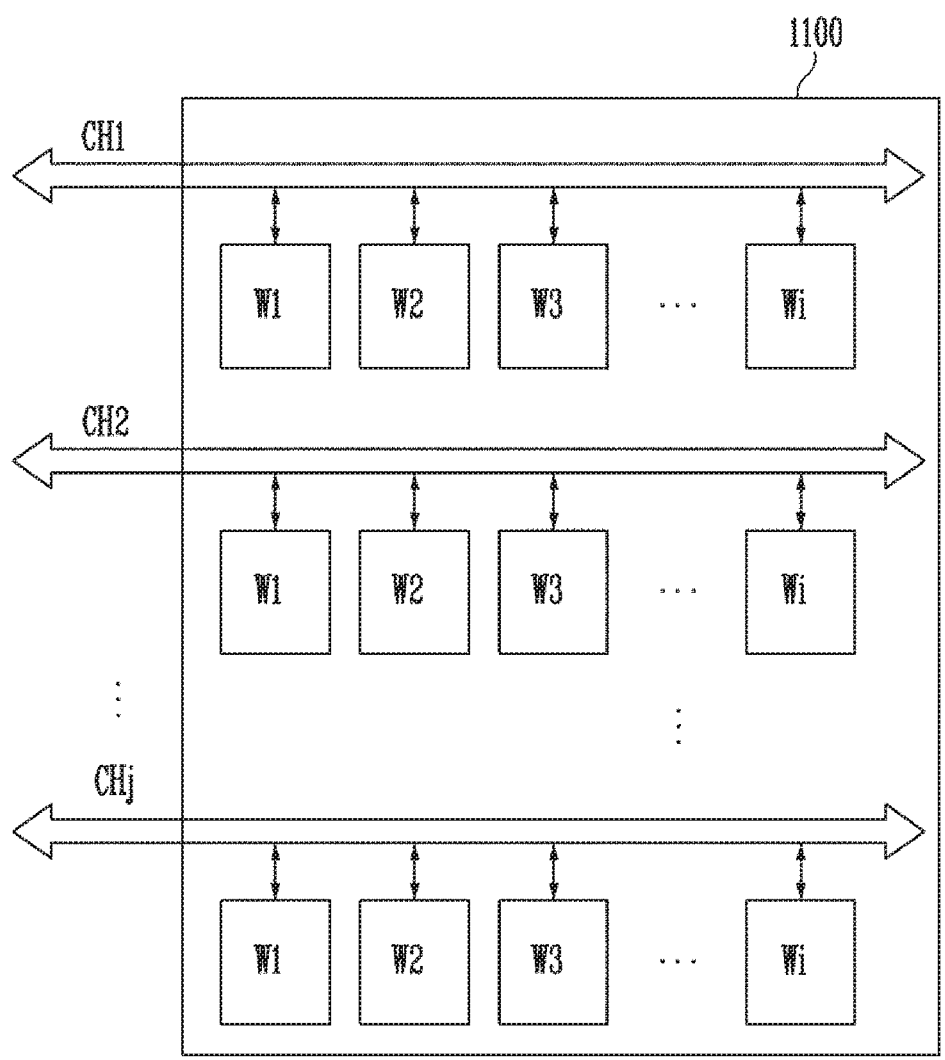
FIG. 3 is a diagram illustrating a memory device of FIG. 1.

FIG. 3 is a diagram illustrating the memory device of FIG. 1.

Referring to FIG. 3, the memory device 1100 may include a plurality of ways W1 to Wi. For example, the memory device 1100 may be coupled to a memory controller 1200 through a plurality of channels CH1 to CHj, and first to i-th ways W1 to Wi may be coupled to each of the channels CH1 to CHj. The first to i-th ways W1 to Wi may be physically separated data storage devices, and the first to i-th ways W1 to Wi coupled to the same channel cannot be simultaneously selected. For example, the first to i-th ways W1 to Wi coupled to the first channel CH1 cannot be simultaneously selected and operated, but ways coupled to different channels CH1 to CHj, among the first to i-th ways W1 to Wi, can be simultaneously selected and operated.

The first to i-th ways W1 to Wi may be equally configured, and thus the first way W1, among the ways, will be described by way of example.

Figure 4:
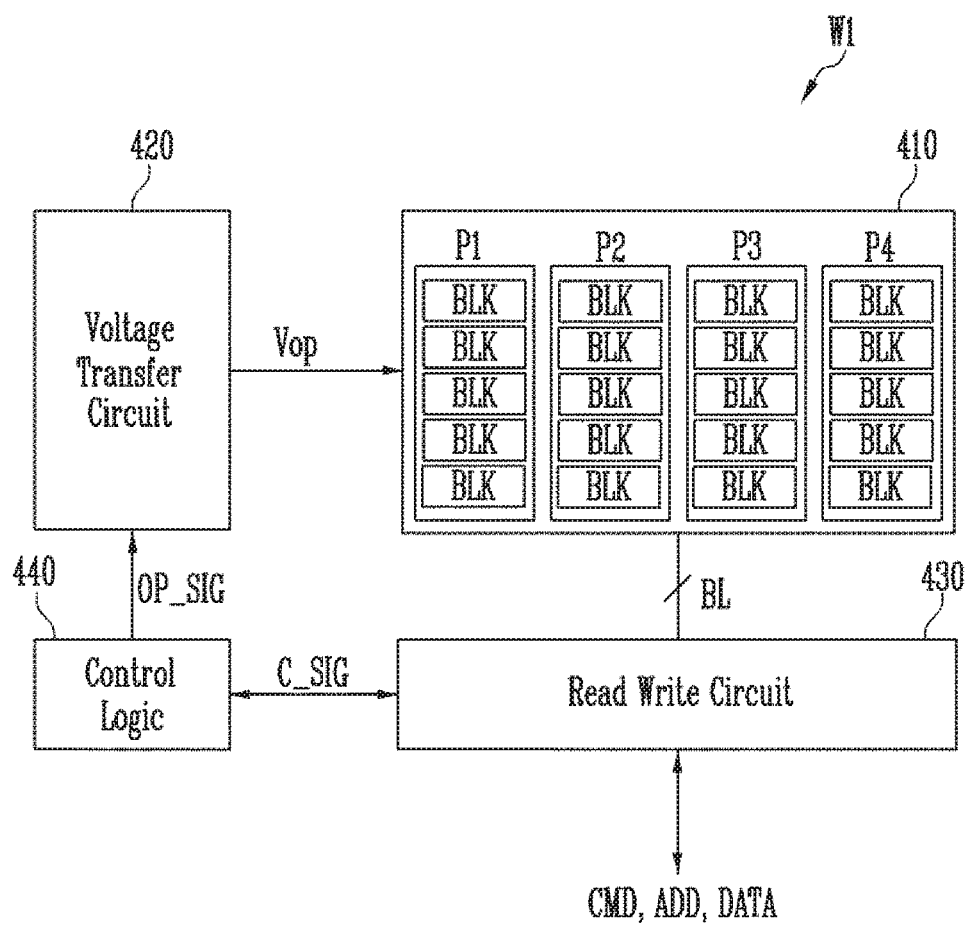
FIG. 4 is a diagram for explaining a first way of FIG. 3.

FIG. 4 is a diagram for explaining the first way of FIG. 3.

Referring to FIG. 4, the first way W1 may include a memory cell array 410 which stores data, peripheral circuits 420 and 430 which perform a program, read or erase operation, and a control logic 440 which controls the peripheral circuits.

The memory cell array 410 may include a plurality of planes P1 to P4. For example, the memory cell array 410 may include first to fourth planes P1 to P4. The first to fourth planes P1 to P4 may be physically separated from each other, and may be operated independently of each other. Each of the first to fourth planes P1 to P4 may include a plurality of memory blocks BLK. The memory blocks BLK may be physically separated from each other. Although not illustrated in the drawing, each of the memory blocks BLK may include a plurality of pages, each having a plurality of memory cells. The memory blocks BLK may each be implemented in a two-dimensional (2D) or three-dimensional (3D) structure. The 2D structure refers to a structure in which memory cells are arranged in a horizontal direction on a substrate. The 3D structure refers to a structure in which memory cells are stacked in a vertical direction on the substrate. Since the 3D structure has the degree of Integration higher than that of the 2D structure, memory blocks BLK having the 3D structure have recently been widely used. The number of planes P1 to P4 and the number of memory blocks BLK are not limited to numbers illustrated in FIG. 4.

The peripheral circuits 420 and 430 may include a voltage transfer circuit 420 and a read write circuit 430.

The voltage transfer circuit 420 may generate operating voltages Vop required for a program, read or erase operation in response to an operation signal OP_SIG, and may transfer the operating voltages Vop to the memory cell array 410.

The read write circuit 430 may receive a command CMD and an address ADD through a channel, and may control the voltages of bit lines BL coupled to the memory cell array 410 or sense the voltages of the bit lines BL in response to control signals C_SIG. In the read write circuit 430, the term "write" may mean a program operation. Further, the read write circuit 430 may transmit/receive data through the channel.

The control logic 440 may be operated in response to various enable signals received through the channel, and may output the operation signal OP_SIG and the control signals C_SIG in response to the command CMD.

Figure 5:
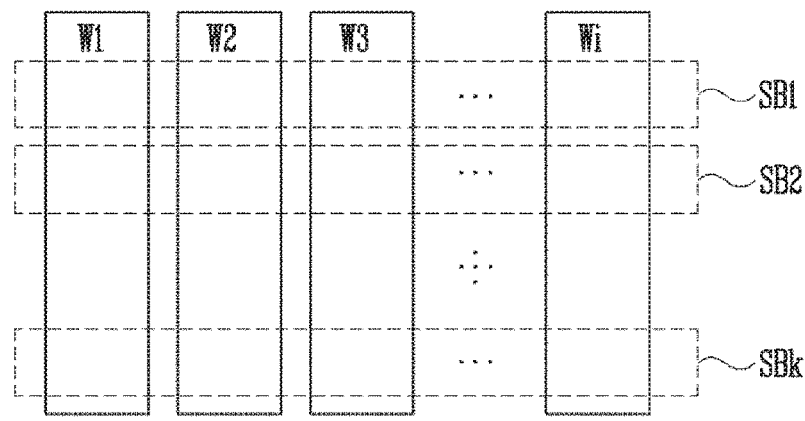
FIG. 5 is a diagram for explaining a super block.

FIG. 5 is a diagram for explaining a super block.

Referring to FIG. 5, first to i-th ways W1 to Wi coupled to the same channel may be physically separated storage devices, but may operate some memory blocks therein as a single logical block. In this way, a set of memory blocks which are physically different, but are logically grouped is referred to as a "super block".

For example, first memory blocks respectively included the first to i-th ways W1 to Wi may be grouped into a single logical block, which may be operated as a first super block SB1. In this way, the memory blocks Included in the first to i-th ways W1 to Wi may be grouped into first to k-th super blocks SB1 to SBk in a logical concept.

Figure 6:
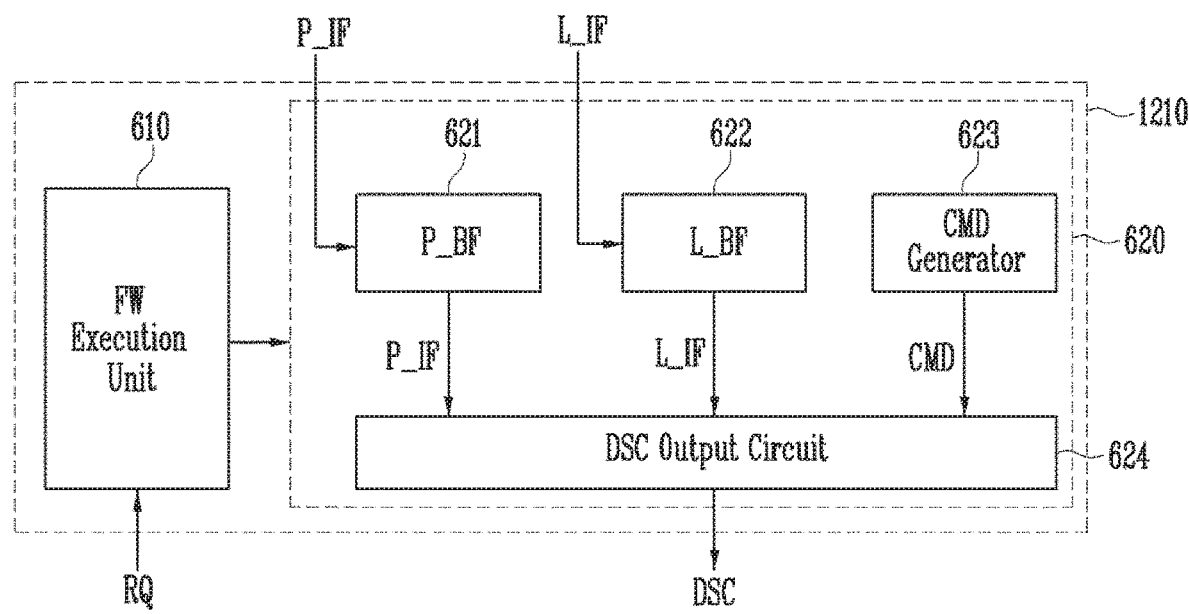
FIG. 6 is a diagram illustrating a flash translation layer and a method of operating the flash translation layer in accordance with an embodiment of the present disclosure.

FIG. 6 is a diagram illustrating the flash translation layer 1210 and a method of operating the flash translation layer 1210 in accordance with an embodiment of the present disclosure.

Referring to FIG. 6, the flash translation layer 1210 may include a firmware (FW) execution unit 610 and a descriptor generator 620.

In response to a request RQ received from a host (e.g., 2000 of FIG. 1), the firmware execution unit 610 may execute firmware for performing the corresponding request. Further, the firmware execution unit 610 may also execute firmware for an operation that is internally performed by the memory controller 1200 even if a request RQ is not received from the host 2000. The firmware execution unit 610 may execute firmware for controlling the descriptor generator 620.

The descriptor generator 620 may include a physical information storage buffer (P_BF) 621, a logical information storage buffer (L_BF) 622, a command (CMD) generator 623, and a descriptor (DSC) output circuit 624.

The physical information storage buffer 621 may temporarily store physical information P_IF for each descriptor. The physical Information P_IF may differ for each descriptor. The physical information P_IF may be information related to or about the physical status of the memory device 1100, in which a corresponding descriptor is executed. For example, the physical information P_IF may include at least one of way information, channel information, memory block address information, page address information, the number-of-partial program cycles (NOP) offset information, single-level cell (SLC) information, multi-level cell (MLC) information, and triple-level cell (TLC) information of the descriptor. In addition, the physical information P_IF may further include structural information of the memory device 1100, in which a corresponding descriptor is executed. Such physical information P_IF may be received from a buffer memory (e.g., 1300 of FIG. 1).

The logical information storage buffer 622 may temporarily store logical information L_IF for each descriptor. The logical information L_IF may differ for each descriptor. The logical information L_IF may be information related to or about the logical status of the memory device 1100, in which a corresponding descriptor is executed. For example, the logical information L_IF may include at least one of super block index information, the number-of-cycling operations information, and block type information of the descriptor, information associated with or about a number of a slot in which the descriptor is stored, and error correction information of the descriptor. In addition, the logical information L_IF may further include operation-related information of the memory device 1100, in which a corresponding descriptor is executed. Such logical information L_IF may be received from the buffer memory 1300 or an internal memory (e.g., 1220 of FIG. 2).

The command generator 623 may generate a command CMD corresponding to a received request RQ. For example, the command CMD may include a program command, a read command or an erase command. In addition, various commands for operating the memory device 1100 may be generated.

The descriptor output circuit 624 may receive the physical information P_IF, the logical information L_IF, and the command CMD from the physical information storage buffer 621, the logical information storage buffer 622, and the command generator 623, respectively, and may output a single descriptor DSC including the received information. That is, the descriptor DSC outputted from the descriptor generator 620 may include the command CMD and the physical information P_IF and the logical information L_IF associated with or about the command CMD.

Figure 7:
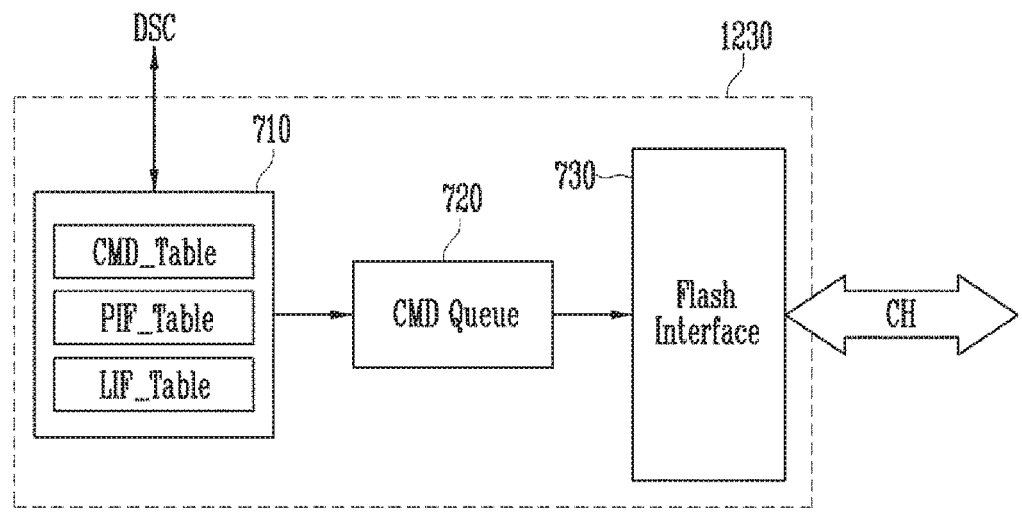
FIG. 7 is a diagram illustrating a flash interface layer of FIG. 2.
Figure 8:
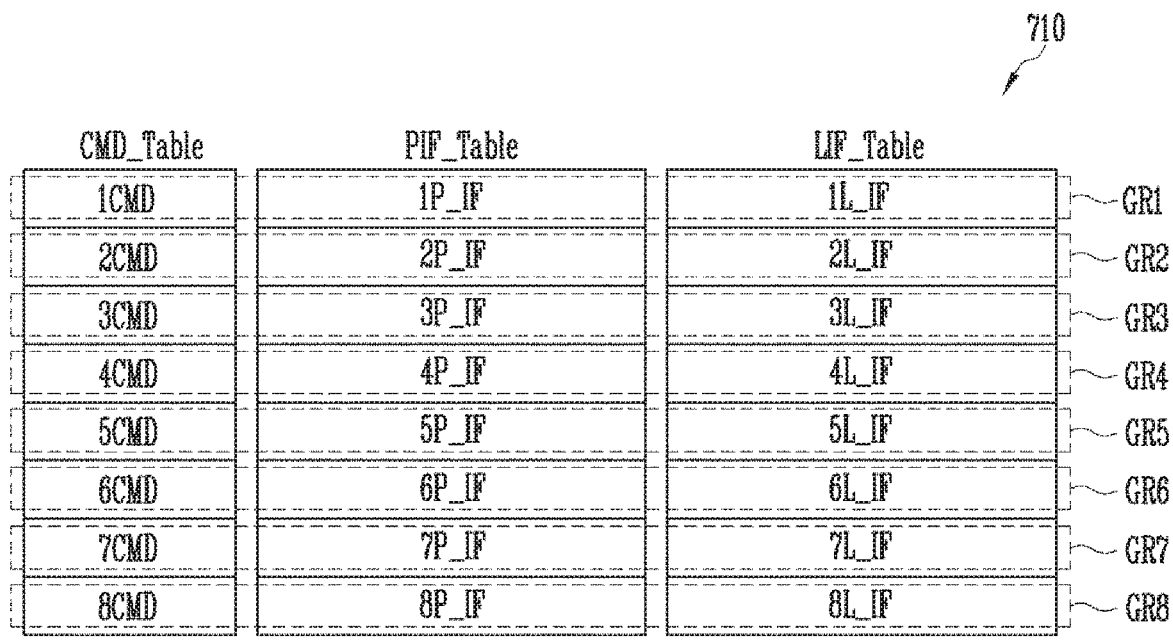
FIG. 8 is a diagram for explaining a lookup table of FIG. 7.

FIG. 7 is a diagram for explaining the flash interface layer 1230 of FIG. 2, and FIG. 8 is a diagram for explaining a lookup table 710 of FIG. 7.

Referring to FIG. 7, the flash interface layer 1230 may include a lookup table 710, a command (CMD) queue 720, and a flash interface 730.

The lookup table 710 may receive a descriptor DSC from a flash translation layer (e.g., 1210 of FIG. 6), and may include a command table CMD_Table, a physical information table PIF_Table, and a logical information table LIF_Table, which respectively store a command CMD, physical information P_IF, and logical information L_IF which are included in the descriptor DSC. Each of the command table CMD_Table, the physical information table PIF_Table, and the logical information table LIF_Table may include a plurality of slots, each of which may store a command CMD, physical information P_IF or logical information L_IF corresponding to one another. That is, information stored in the same slot in the command table CMD_Table, the physical information table PIF_Table, and the logical information table LIF_Table may be managed as a single group. The lookup table 710 will be described in detail with reference to FIG. 8.

Referring to FIG. 8, it is assumed that a first command 1CMD, first physical information 1P_IF and first logical information 1L_IF are included in a single descriptor DSC. In this case, the first command 1CMD is stored in the first slot of the command table CMD_Table, first physical information 1P_IF is stored in the first slot of the physical information table PIF_Table, and first logical information 1L_IF is stored in the first slot of the logical information table LIF_Table. The first command 1CMD, the first physical information 1P_IF and the first logical information 1L_IF may be managed together as a first group GR1. That is, the first physical information 1P_IF and the first logical information 1L_IF, which are included in the first group GR1, may be physical and logical information associated with or about the first command 1CMD.

In this way, the lookup table 710 may include a plurality of slots, and commands and information stored in respective slots may be grouped and managed. For example, eighth logical information 8P_IF and eighth logical information 8L_IF associated with or about an eighth command 8CMD may be stored as an eighth group GR8.

Also, when a newly provided descriptor includes the same command as stored in the lookup table 710, the lookup table 710 may update, in real time, physical information P_IF and logical information L_IF associated with or about the corresponding command. Information of the first to eighth groups GR1 to GR8 stored in the lookup table 710 may be outputted to the flash translation layer (e.g., 1210 of FIG. 6) when a request is received from the flash translation layer (e.g., 1210 of FIG. 6). FIG. 8 illustrates an embodiment of the lookup table 710 given for convenience of description, and thus the number of commands CMD, the number of pieces of physical information P_IF, the number of pieces of logical information L_IF, and the number of groups GR are not limited to numbers illustrated in FIG. 8.

Referring back to FIG. 7, the commands CMD stored in the lookup table 710 may be transmitted to the command (CMD) queue 720. The command queue 720 may manage the execution sequence of the commands depending on the status of the memory device 1100, and may sequentially output the commands, the execution sequence of which has been adjusted.

The flash interface 730 may output each command CMD, received from the command queue 720, to the memory device 1100 through the channel CH.

Figure 9:
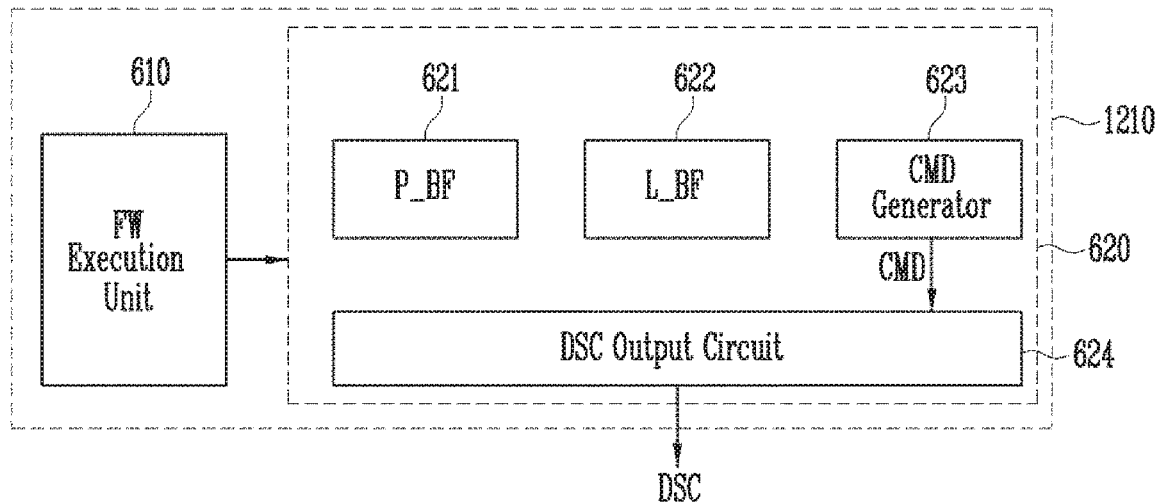
FIGS. 9 and 10 are diagrams illustrating a method of operating a flash translation layer in accordance with an embodiment of the present disclosure.
Figure 10:
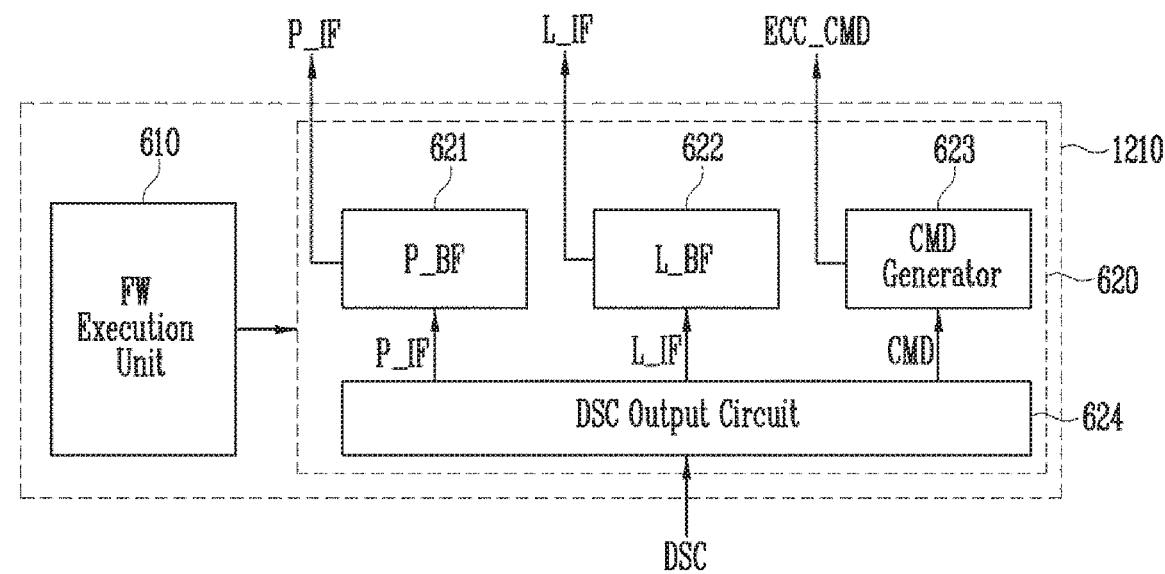
Figure 10:
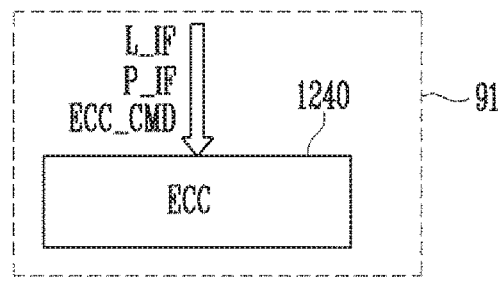

FIGS. 9 and 10 are diagrams illustrating a method of operating the flash translation layer 1210 in accordance with an embodiment of the present disclosure.

Referring to FIG. 9, when physical information P_IF and logical information L_IF are required, the flash translation layer 1210 may receive physical information P_IF and logical information L_IF for the corresponding descriptor DSC from the flash interface layer (e.g., 1230 of FIG. 7), and may use the received information for the required operation.

For example, when an error correction operation is performed, a firmware execution unit 610 may execute firmware for error correction, and may transmit an error correction request to a descriptor generator 620. The command generator 623 of the descriptor generator 620 may generate an error correction command ECC_CMD corresponding to the error correction request. A descriptor output circuit 624 may receive the error correction command ECC_CMD from the command generator 623, and may output a descriptor DSC including the received error correction command ECC_CMD to the error correction circuit (ECC) 1240. The descriptor also includes a physical information P_IF, and a logical information L_IF corresponding to the error correction command ECC_CMD. Moreover, the descriptor is distinguished from other descriptors by the error correction command ECC_CMD.

Referring to FIG. 10, the descriptor output circuit 624 may receive a descriptor DSC including physical information P_IF and logical information L_IF from the flash interface layer 1230, and may transmit a command CMD included in the received descriptor DSC to the command generator 623, transmit the logical information L_IF included in the received descriptor DSC to the logical information storage buffer 622, and transmit the physical information P_IF included in the received descriptor DSC to the physical information storage buffer 621.

The command generator 623 may generate an error correction command ECC_CMD in response to an error correction request. The logical information storage buffer 622 may temporarily store the logical information L_IF, and may again output the stored logical information. The physical information storage buffer 621 may temporarily store the physical information P_IF, and may again output the stored physical information.

The error correction command ECC_CMD, the physical information P_IF, and the logical information L_IF, outputted from the descriptor generator 620, may be transmitted to the error correction circuit (ECC) 1240 (91), and the error correction circuit 1240 may perform an error correction operation in response to the error correction command ECC_CMD, the physical information P_IF, and the logical information L_IF.

As described above, physical information P_IF and logical information L_IF for each descriptor are stored in the flash interface layer 1230, and are updated in real time, and thus the flash translation layer 1210 may rapidly receive the physical information P_IF and the logical information L_IF, and may rapidly perform an operation requiring the received information. As a result, the performance of the flash translation layer 1210 may be improved, and the performance of the memory controller 1200 including the flash translation layer 1210 may also be improved. Further, since logical information L_IF is stored in the flash interface layer 1230 instead of the internal memory (e.g., 1220 of FIG. 2), the storage capacity of the internal memory (e.g., 1220 of FIG. 2) may be secured.

Figure 11:
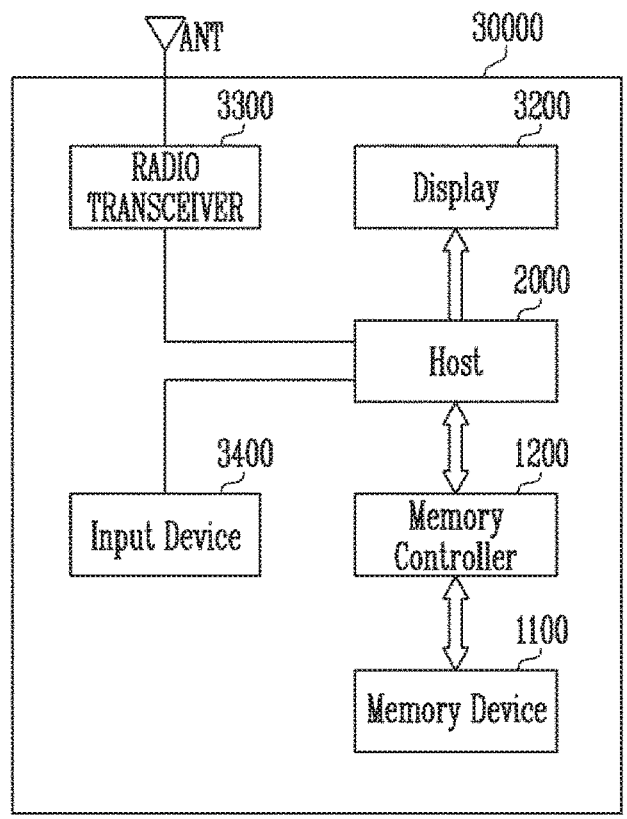
FIG. 11 is a diagram illustrating an embodiment of the memory system of FIG. 1.

FIG. 11 is a diagram illustrating an embodiment of the memory system of FIG. 1.

Referring to FIG. 11, a memory system 30000 may be implemented as a cellular phone, a smart phone, a tablet PC, a personal digital assistant (PDA) or a wireless communication device.

The memory system 30000 may include a memory device 1100, a memory controller 1200 that is capable of controlling the operation of the memory device 1100, and a host 2000 that is capable of controlling the memory controller 1200. The memory controller 1200 may control a data access operation of the memory device 1100, for example, a program operation, an erase operation or a read operation, under the control of the host 2000.

Data programmed to the memory device 1100 may be outputted via a display 3200 under the control of the memory controller 1200.

A radio transceiver 3300 may exchange radio signals through an antenna ANT. For example, the radio transceiver 3300 may convert radio signals received through the antenna ANT into signals that may be processed by the host 2000. Therefore, the host 2000 may process the signals outputted from the radio transceiver 3300, and may transmit the processed signals to the memory controller 1200 or the display 3200. The memory controller 1200 may transmit the signals, processed by the host 2000, to the memory device 1100. Further, the radio transceiver 3300 may convert signals outputted from the host 2000 into radio signals, and output the converted radio signals to an external device through the antenna ANT. An input device 3400 may be used to input a control signal for controlling the operation of the host 2000 or data to be processed by the host 2000. The input device 3400 may be implemented as a pointing device such as a touch pad or a computer mouse, a keypad or a keyboard. The host 2000 may control the operation of the display 3200 so that data outputted from the memory controller 1200, data outputted from the radio transceiver 3300, or data outputted from the input device 3400 is outputted via the display 3200.

Figure 12:
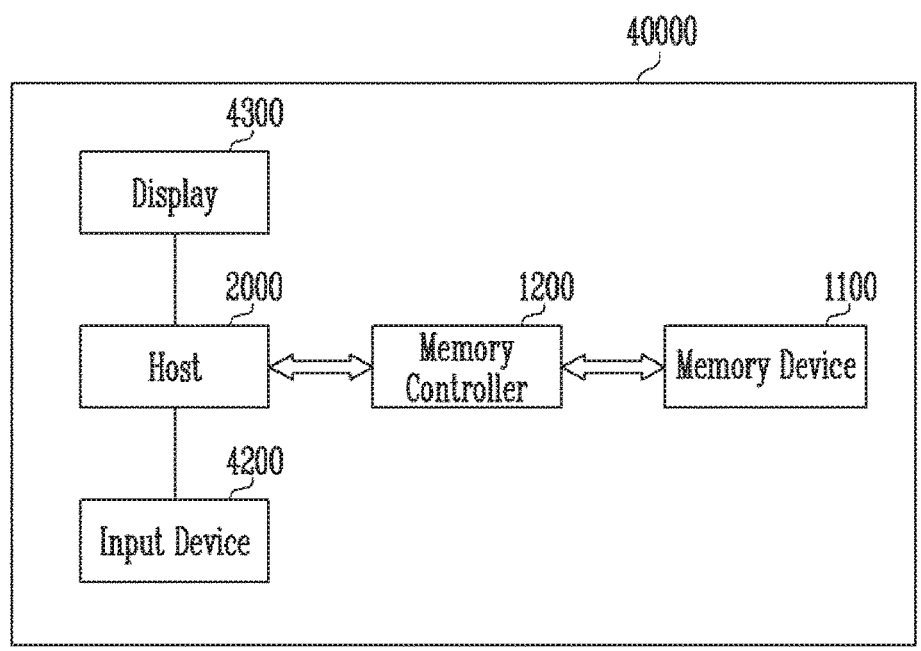
FIG. 12 is a diagram illustrating an embodiment of the memory system of FIG. 1.

FIG. 12 is a diagram illustrating an embodiment of the memory system of FIG. 1.

Referring to FIG. 12, a memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may include a memory device 1100, a memory controller 1200 that is capable of controlling a data processing operation of the memory device 1100, and a host 2000 that is capable of controlling the memory controller 1200.

Further, the host 2000 may output data, stored in the memory device 1100, via a display 4300 according to data inputted through an input device 4200. For example, the input device 4200 may be implemented as a pointing device such as a touch pad or a computer mouse, a keypad or a keyboard.

The host 2000 may control the overall operation of the memory system 40000, and may control the operation of the memory controller 1200.

Figure 13:
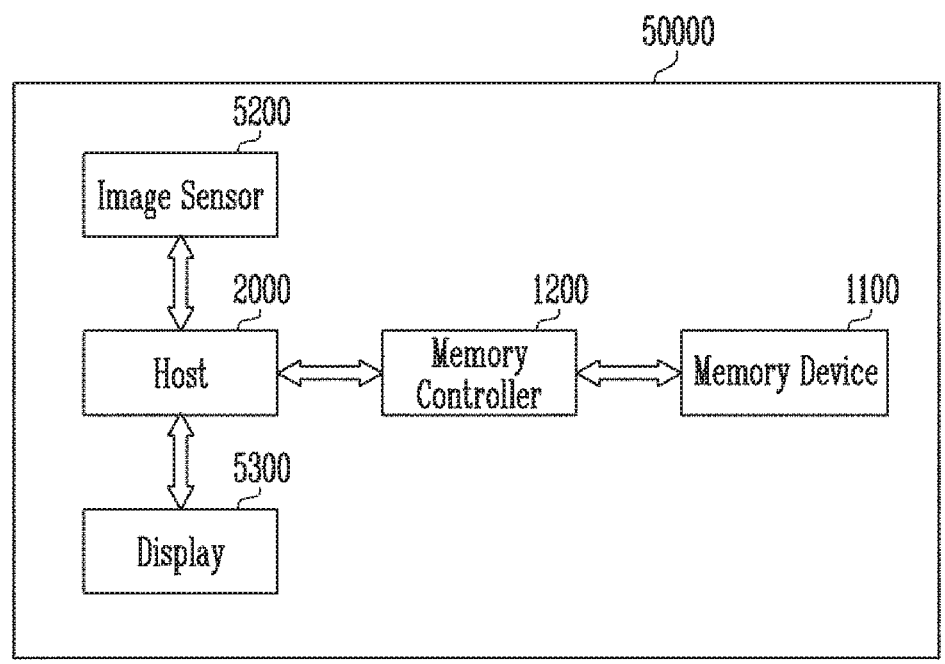
FIG. 13 is a diagram illustrating an embodiment of the memory system of FIG. 1.

FIG. 13 is a diagram illustrating an embodiment of the memory system of FIG. 1.

Referring to FIG. 13, a memory system 50000 may be embodied in an image processing device, e.g., a digital camera, a mobile phone provided with a digital camera, a smartphone provided with a digital camera, or a tablet PC provided with a digital camera.

The memory system 50000 may include a memory device 1100, a memory controller 1200 that is capable of controlling a data processing operation of the memory device 1100, e.g., a program operation, an erase operation or a read operation, and a host 2000 that is capable of controlling the memory controller 1200.

An image sensor 5200 of the memory system 50000 may convert an optical image into digital signals, and the converted digital signals may be transmitted to the host 2000. Under the control of the host 2000, the converted digital signals may be outputted via a display 5300 or stored in the memory device 1100 through the memory controller 1200. Further, data stored in the memory device 1100 may be outputted via the display 5300 under the control of the host 2000.

Figure 14:
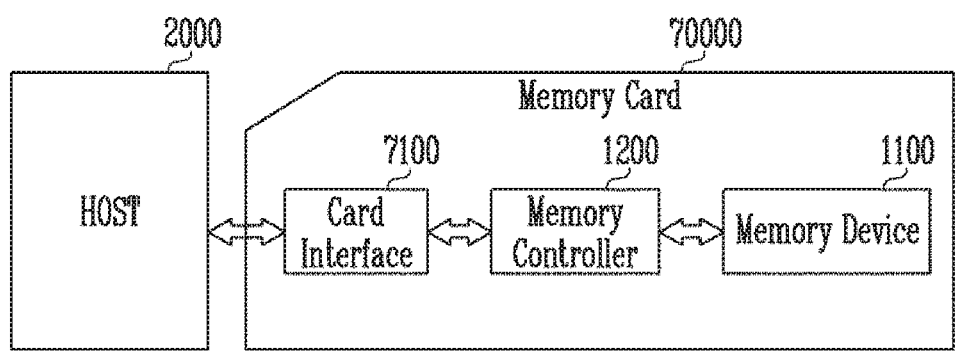
FIG. 14 is a diagram illustrating an embodiment of the memory system of FIG. 1.

FIG. 14 is a diagram illustrating an embodiment of the memory system of FIG. 1.

Referring to FIG. 14, the memory system may include a memory card 70000.

The memory card 70000 may be implemented as a smart card. The memory card 70000 may include a memory device 1100, a memory controller 1200, and a card interface 7100.

The memory controller 1200 may control data exchange between the memory device 1100 and the card interface 7100. In an embodiment, the card interface 7100 may be, but is not limited to, a secure digital (SD) card interface or a multi-media card (MMC) interface. Further, the card interface 7100 may interface data exchange between the host 2000 and the memory controller 1200 according to a protocol of the host 2000. In an embodiment, the card interface 7100 may support a universal serial bus (USB) protocol and an interchip (IC)-USB protocol. Here, the card interface 7100 may refer to hardware capable of supporting a protocol which is used by the host 2000, software installed in the hardware, or a signal transmission method performed by the hardware.

The present disclosure may manage physical information and logical information for each descriptor so that the physical information and the logical information are mapped to each other, thus improving the performance of a flash translation layer. Accordingly, the performance of a memory controller including the flash translation layer may be improved.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

What is claimed is:

1. A memory controller, comprising:
   a flash translation layer configured to output a descriptor including a command and physical information and logical information associated with the command; and
   a flash interface layer configured to:
   receive the descriptor, individually store the command, the physical information, and the logical information that are included in the descriptor;
   adjust a queue of the command; and
   output the command to a memory device according to an adjusted queue of the command,
   wherein the flash translation layer comprises:
     a command generator configured to generate a command;
     a physical information storage buffer configured to receive physical information associated with the command and temporarily store the physical information;
     a logical information storage buffer configured to receive logical information associated with the command and temporarily store the logical information; and
     a descriptor output circuit configured to generate the descriptor including the command, the physical information, and the logical information.

2. The memory controller according to claim 1, wherein the command generator is configured to:
   generate the command in response to a request received from a host, or
   generate the command for an internal operation of the memory controller.

3. The memory controller according to claim 1, wherein the physical information storage buffer is configured to:
   receive the physical information associated with the command, among pieces of information stored in a buffer memory or an internal memory device, and temporarily store the physical information, and
   transmit the physical information to the descriptor output circuit.

4. The memory controller according to claim 1, wherein the logical information storage buffer is configured to:
   receive the logical information associated with the command, among pieces of information stored in a buffer memory or an internal memory device, and temporarily store the logical information, and
   transmit the logical information to the descriptor output circuit.

5. The memory controller according to claim 1, wherein the descriptor output circuit is configured to generate a descriptor corresponding to the command such that both the physical information and the logical information are included in the descriptor.

6. The memory controller according to claim 1, wherein the physical information and the logical information include different pieces of information for respective descriptors.

7. The memory controller according to claim 1, wherein the physical information and the logical information include information related to a physical status and a logical status of the memory device when the descriptor is executed.

8. The memory controller according to claim 7, wherein the physical information comprises at least one of way information, channel information, memory block address information, page address information, a number-of-partial program cycles (NOP) offset information, single-level cell (SLC) information, multi-level cell (MLC) information, and triple-level cell (TLC) information of the descriptor.

9. The memory controller according to claim 7, wherein the logical information comprises at least one of super block index information, a number-of-cycling operations information, and block type information of the descriptor, information associated with a number of a slot in which the descriptor is stored, and error correction information of the descriptor.

10. The memory controller according to claim 1, wherein the flash interface layer comprises:
    a lookup table configured to store information included in the descriptor for each slot;
    a command queue configured to queue the command included in the descriptor; and
    a flash interface configured to transmit the queued command to the memory device.

11. The memory controller according to claim 10, wherein the lookup table comprises:
    a command table configured to store the command included in the descriptor in a corresponding slot;
    a physical information table configured to store the physical information included in the descriptor in a corresponding slot; and
    a logical information table configured to store the logical information included in the descriptor in a corresponding slot.

12. The memory controller according to claim 11, wherein the command, the physical information, and the logical information respectively stored in the command table, the physical information table, and the logical information table are grouped and managed on a slot basis.

13. The memory controller according to claim 12, wherein the lookup table is configured to, depending on a descriptor requested by the flash translation layer, output a command, physical information, and logical information of a group corresponding to the requested descriptor to the flash translation layer.

14. A memory controller, comprising:
    a flash translation layer configured to output a descriptor including a command and physical information and logical information associated with the command; and
    a flash interface layer configured to receive the descriptor and store the command, the physical information, and the logical information included in the descriptor, and to transmit the command, the physical information, and the logical information for a requested descriptor to the flash translation layer when a request is received from the flash translation layer,
    wherein the flash interface layer comprises:
      a lookup table configured to store or update the command, the physical information, and the logical information for each descriptor;

a command queue configured to queue the command received from the lookup table depending on a status of a memory device; and a flash interface configured to output the queued command to the memory device through a channel.

15. The memory controller according to claim 14, wherein the flash translation layer is configured to:

at an error correction operation, request a descriptor associated with the error correction operation from the flash interface layer, and generate an error correction command in response to the descriptor received from the flash interface layer, and transmit the error correction command, the physical information, and the logical information to an error correction circuit.

16. The memory controller according to claim 14, wherein the physical information comprises at least one of way information, channel information, memory block address information, page address information, a number-of-partial program cycles (NOP) offset information, single-level cell (SLC) information, multi-level cell (MLC) information, and triple-level cell (TLC) information of the descriptor.

17. The memory controller according to claim 14, wherein the logical information comprises at least one of super block index information, a number-of-cycling operations information, and block type information of the descriptor, information associated with a number of a slot in which the descriptor is stored, and error correction information of the descriptor.

18. A memory system, comprising:

a memory controller configured to generate a command in response to a request from a host and generate a descriptor including both physical information and logical information associated with the command, and configured to, when the descriptor is requested, output all of the command, the physical information, and the logical information included in the descriptor; and a memory device configured to program, read or erase data in response to the command outputted from the memory controller, wherein the memory controller includes a flash translation layer and a flash interface layer, wherein the flash translation layer comprises:

a command generator configured to generate a command;

a physical information storage buffer configured to receive physical information associated with the command and temporarily store the physical information;

a logical information storage buffer configured to receive logical information associated with the command and temporarily store the logical information; and a descriptor output circuit configured to generate the descriptor including the command, the physical information, and the logical information, and wherein the flash interface layer comprises:

a lookup table configured to store or update the command, the physical information, and the logical information for each descriptor;

a command queue configured to queue the command received from the lookup table depending on a status of a memory device; and a flash interface configured to output the queued command to the memory device through a channel.

19. A controller for controlling a memory device, the controller comprising:

a command generator configured to generate a command;

a physical information storage buffer configured to buffer physical information about the command;

a logical information storage buffer configured to buffer logical information about the command;

a descriptor output circuit configured to generate a descriptor including the command, the physical information, and the logical information associated to the command;

a lookup table configured to store the descriptor;

a command queue configured to queue the command included in the descriptor;

a flash interface configured to provide the queued command to the memory device to perform an operation in response to the provided command; and an error correction unit configured to perform an error correction operation according to the descriptor, wherein the lookup table provides the command generator with the descriptor stored therein through the physical and logical information storage buffers in response to a request provided from the command generator.

* * * * *